3,037,046
BENZOCAINE PROCESS

George M. Illich, Jr., Lake Forest, Ralph M. Robinson, Chicago, William D. Smart, Waukegan, and Floyd C. Garven, Gurnee, Ill., assignors to Abbott Laboratories, North Chicago, Ill., a corporation of Illinois
No Drawing. Filed Oct. 24, 1958, Ser. No. 769,285
7 Claims. (Cl. 260—471)

This invention relates to an improved process for preparing ethyl p-aminobenzoate commonly known as benzocaine. In particular, it relates to an improved process for directly purifying the intermediate ethyl p-nitrobenzoate and directly reducing said intermediate to benzocaine.

Benzocaine is a well-known local anesthetic. The general procedure of esterifying p-nitrobenzoic acid with ethanol and catalytically reducing the resulting ester to ethyl p-aminobenzoate is well known. However, this general process involves a series of difficult purification steps to isolate the desired ester. The intermediate ethyl p-nitrobenzoate must be washed repeatedly to remove undesirable by-products. This period of washing is greatly extended and may continue for several days in the case of large-scale operations. Such purification steps are necessary as a preliminary procedure to the subsequent reduction of the intermediate ester. The succeeding reduction step is also associated with undesirable delays and difficulties, such as preliminary isolation of the intermediate ester product. Following such isolation, said intermediate product must be treated repeatedly to obtain an acceptable yield of pure benzocaine. The actual reduction process has often resulted in a benzocaine product varying in purity from batch to batch. This occurs in the well-known iron catalyst reduction method.

One object of this invention is to provide a new and improved method of producing benzocaine of high purity by direct and efficient process steps.

Another object of this invention is to provide a more economical method which yields high-grade benzocaine of unvarying purity from batch to batch.

A further object of this invention is to eliminate some of the prior art purification and isolation steps for obtaining the intermediate ethyl p-nitrobenzoate ester.

A still further object of this invention is to provide a method to utilize ethyl p-nitrobenzoate more efficiently in subsequent reduction to the desired benzocaine product.

In accordance with the foregoing and other objects, the practice of this invention substantially provides for the customary initial esterification of p-nitrobenzoic acid with ethanol under reflux conditions in an inert water-immiscible solvent and in the presence of a catalyst, such as a strong mineral acid, to produce ethyl p-nitrobenzoate. Following the standard esterification step, the teaching of this invention provides cooling the solvent mixture containing ethyl p-nitrobenzoate to about room temperature, and without isolating the ester, the mixture is washed with water and an alkaline solution. Following the washing step, the catalyst, excess alcohol and unreacted p-nitrobenzoic acid are removed from the solvent mixture by conventional means. The ethyl p-nitrobenzoate dissolved in the reaction solvent is of relatively high purity and is, thereafter, directly reduced in the solvent to produce high yields of benzocaine of excellent purity.

The foregoing novel process is characterized by a much shorter period of washing to provide the intermediate ethyl p-nitrobenzoate ester in a pure form, free from the presence of catalyst, excess alcohol and unreacted p-nitrobenzoic acid. This substantial decrease in time results from washing said intermediate ester while it remains in solution rather than isolating it.

An important contribution of the process is the direct reduction of the ethyl p-nitrobenzoate ester in the reaction solvent, rather than isolating said ester prior to reduction. Once the reduction step is concluded, the ethyl p-aminobenzoate product while still in solution is treated with an adsorbent, such as metallic oxides, to leave benzocaine of high purity in solution. The benzocaine is obtained directly from the reaction solvent by cooling said solution to room temperature. At this lower temperature, the benzocaine crystallizes from the solution in a pure form.

The foregoing step contributes to the efficient practice of the improved process because it has been found that ethyl p-nitrobenzoate is soluble in the solvent at room temperature and the reduced product, ethyl p-aminobenzoate, is substantially insoluble at room temperature.

The over-all time required to complete the process is about 13 hours. This comprises about 10 hours expended in refluxing to produce the ester and about 3 hours expended in reducing the ethyl p-nitrobenzoate and purifying the final benzocaine product.

The water-immiscible, non-polar, inert organic solvents employed in this process include xylene, diethylbenzene, benzene, ethylene dichloride, toluene, cumene and the like. In all of the foregoing solvents, p-nitrobenzoic acid is soluble at the boiling temperature of said solvents, whereas the intermediate ester, ethyl p-nitrobenzoate, is soluble at room temperature and the desired ethyl p-aminobenzoate is only slightly soluble at ambient temperature.

The reduction of the intermediate ethyl p-nitrobenzoate is carried out in the presence of a noble metal catalyst, such as platinum, palladium, rhodium and the like. The catalyst may be supported on any suitable carrier, such as carbon, alumina ($Al_2O_3$), silica ($SiO_2$) and the like. While all of the foregoing solvents and catalysts may be employed in the process, a preferred embodiment employs toluene as the reaction solvent and palladium as the catalyst.

The following examples are presented to teach the invention in practice. It is understood that recitation of the following reactants, reagents, proportions thereof and steps is not intended to be an exclusive illustration.

Example I

In a one-liter flask equipped with a stirrer and reflux condenser is placed 167 grams of p-nitrobenzoic acid, 150 ml. of ethanol, 15 ml. of sulfuric acid and 300 ml. of toluene. The mixture is heated at the boiling temperature and under reflux for 10 hours. The reaction mixture is then cooled to about 25° C. and washed successively with 200 ml. of water and a solution containing 15 grams of sodium carbonate in 200 ml. of water. The toluene solution of ethyl p-nitrobenzoate is separated and catalytically reduced to the desired ethyl p-aminobenzoate by introducing said solution into a pressure vessel and intimately mixing therewith 2 grams of a palladium carbon catalyst containing 5% by weight of palladium. Hydrogenation is initiated by agitating said vessel and raising the pressure therein to about 30 p.s.i.g. The temperature is maintained between 50°–65° C. until the reaction is complete as indicated by a decrease in pressure. Upon completion of the reaction, the hot reaction mixture is filtered to remove the catalyst, and the filtrate is treated with an adsorbent (superfilterol—a mixture of metallic oxides) to remove dissolved undesirable by-products. After removing the adsorbent by filtration, the filtrate is cooled to room temperature to precipitate the desired ethyl p-aminobenzoate product which is thereafter separated by filtration. The yield is 84.2% of theory.

Example II

The ethyl p-nitrobenzoate ester is prepared in the manner outlined in Example I, except that ethylene dichloride is employed in place of toluene as the inert, water-immiscible solvent. The ester is thereafter hydrogenated, and the reaction mixture is processed as previously described to obtain the desired ethyl p-aminobenzoate as a white crystalline solid in a yield of 88.5%.

*Example III*

The ethyl p-nitrobenzoate ester is prepared according to the process outlined in Example I, with the modification that xylene is employed in place of toluene as the inert, water-immiscible solvent. The ester dissolved in xylene is hydrogenated, the catalyst is removed and the reaction mixture processed as previously described to obtain the desired ethyl p-aminobenzoate product as a crystalline solid in a yield of 84.9%.

*Example IV*

Ethyl p-nitrobenzoate is prepared in the same manner as described in Example I, with the modification that benzene is employed in place of toluene as the inert, water-immiscible solvent. The intermeditae ester (18.9 grams) dissolved in benzene is hydrogenated in the presence of 1.89 grams of a rhodium-alumina oxide catalyst containing 5% by weight of rhodium at a pressure of 30 p.s.i.g. and a temperature of about 60° C. The resulting hydrogenated product is thereafter processed as described in Example I to obtain ethyl p-aminobenzoate melting at 86°–87° C. in a yield of approximately 100% of theory. This product is found to be 99.9% pure.

In the foregoing process, a high yield of ethyl p-nitrobenzoate is obtained by a minimum amount of purification. Said ethyl p-nitrobenzoate is sufficiently pure for subsequent catalytic reduction to ethyl p-aminobenzoate directly in the solvent solution in the presence of a noble metal catalyst to produce benzocaine in good yield and of a very high quality both in purity and color. The noble metal catalyst may be recovered and re-used for subsequent reduction. This desirable feature contributes additionally to the economic advantages of the process.

The formed ethyl p-nitrobenzoate dissolved in organic solvent is washed with water to remove the unreacted acid catalyst and excess alcohol. In the embodiments presented herein, the washing is supplemented by utilizing a solution of sodium carbonate to remove unreacted p-nitrobenzoic acid. However, other standard washing techniques may be employed to remove unreacted p-nitrobenzoic acid from the organic solvent. The washing technique may comprise other water-soluble bases such as sodium carbonate, sodium hydroxide and others. As an alternative method, the unreacted p-nitrobenzoic acid may be recovered from the basic wash by acidification.

Others may practice the invention in any of the numerous ways which will be suggested by this disclosure to one skilled in the art. All such practice of the invention is considered to be a part hereof provided it falls within the scope of the appended claims.

We claim:

1. In the method of preparing benzocaine by esterifying p-nitrobenzoic acid with ethyl alcohol, the improvement which comprises the steps of conducting the esterification in an inert, water-immiscible solvent, washing the solvent mixture containing the resulting ethyl p-nitrobenzoate successively with water and an aqueous alkaline solution, catalytically reducing the purified ethyl p-nitrobenzoate directly in the solvent mixture at a temperature of from 50° to 65° C. and thereafter cooling the solvent mixture to about room temperature to precipitate the benzocaine.

2. In the method of preparing benzocaine by esterifying p-nitrobenzoic acid with ethyl alcohol, the improvement which comprises the steps of conducting the esterification in an inert, water-immiscible solvent, washing the solvent mixture of ethyl p-nitrobenzoate successively with water and an aqueous alkaline solution, reducing the resulting purified ethyl p-nitrobenzoate directly in the solvent mixture in the presence of a catalytic amount of a noble metal catalyst at a temperature of from 50° to 65° C. and thereafter cooling the solvent mixture to about room temperature to precipitate the benzocaine.

3. A process according to claim 2 wherein the water-immiscible solvent is benzene and the catalyst is rhodium.

4. A process according to claim 2 wherein the water-immiscible solvent is toluene and the catalyst is rhodium.

5. A process according to claim 2 wherein the water-immiscible solvent is xylene and the catalyst is rhodium.

6. A process according to claim 2 wherein the water-immiscible solvent is ethylene dichloride and the catalyst is rhodium.

7. A process according to claim 2 wherein the water-immiscible solvent is toluene and the catalyst is palladium.

References Cited in the file of this patent

UNITED STATES PATENTS

| | | |
|---|---|---|
| 2,269,791 | Shonle et al. | Jan. 13, 1942 |
| 2,426,276 | Meiser | Aug. 26, 1947 |
| 2,604,488 | Freire | July 22, 1952 |

OTHER REFERENCES

Organic Synthesis, Coll. vol. I, pages 240 and 241, J. Wiley, 1941.